United States Patent [19]

Gustavsson

[11] Patent Number: 4,693,145

[45] Date of Patent: Sep. 15, 1987

[54] METHOD OF CONTINUOUSLY GRINDING THE TEETH OF SAW BANDS AND SAW BLADES

[75] Inventor: Harry Gustavsson, Halmstad, Sweden

[73] Assignee: AB Wedalco Centerless, Halmstad, Sweden

[21] Appl. No.: 788,115

[22] Filed: Oct. 16, 1985

[30] Foreign Application Priority Data

Oct. 17, 1984 [SE] Sweden .............................. 8405176-2

[51] Int. Cl.⁴ ........................ B23D 63/12; B23D 65/00
[52] U.S. Cl. ..................................... 76/112; 76/25 R
[58] Field of Search ............... 76/112, 47 R, 50, 25 R, 76/28, 29

[56] References Cited

U.S. PATENT DOCUMENTS 4,434,685  3/1984  Junker .................................. 76/112

FOREIGN PATENT DOCUMENTS 853702   10/1952  Fed. Rep. of Germany .
3022292   4/1982  Fed. Rep. of Germany .
3217362A1 5/1982  Fed. Rep. of Germany .
140654    4/1920  United Kingdom .................. 76/112

*Primary Examiner*—Roscoe V. Parker
*Attorney, Agent, or Firm*—Cushman, Darby & Cushman

[57] ABSTRACT

A method and device for continuously grinding the teeth of a number of adjacent saw bands using a rotating grinding wheel which is reciprocatingly moveable in a direction transverse to the longitudinal direction of the saw bands. The method comprising lowering the grinding wheel at the start of each reciprocating grinding movement a predetermined distance which corresponds to wear the grinding wheel experienced in the prior grinding cycle. As the grinding wheel is moved towards the band material, it is acted on by a stationary abrasing wheel which reshapes the grinding wheel. During the return stroke of the grinding wheel the saw band blanks are advanced and repositioned for another cycle of the grinding wheel.

4 Claims, 8 Drawing Figures

METHOD OF CONTINUOUSLY GRINDING THE TEETH OF SAW BANDS AND SAW BLADES

The present invention relates to a method of continuously grinding teeth into a number of adjacent saw band blanks. The method involves reciprocatingly moving, in a direction transverse to the longitudinal direction of the saw bands, a rotating grinding wheel. The present invention also relates to a device for performing the grinding method.

BACKGROUND OF THE INVENTION

Saw bands manufactured by the process of grinding saw teeth into steel band material are previously known. According to De-C-3.022.292 the saw teeth are ground into a steel band by two grinding wheels, arranged one after the other, which are provided with helical cutting grooves. The first grinding wheel produces a rough tooth form, while the second grinding wheel finely grinds and sharpens the teeth. As the teeth are manufactured by this "helical grinding operation", where the grinding wheels are in continuous contact with the saw band, the rotational velocity of the grinding wheels will determine the feed velocity of the steel band.

Another known saw tooth grinding device is disclosed in German patent No. 853.702. In this device, milled saw teeth are ground by means of two or more grinding wheels arranged in a spaced apart manner. The first wheel grinds the breast of the teeth and the following wheel grinds the backs of the teeth. The grinding device requires synchronization between the feeding of the band and the successive raising of the grinding wheel from the saw band. Such a synchronization requirement results in a complicated and therefore expensive mechanical device. Further, with such a device, it is only possible to machine the saw bands one at a time. In this manner, the capacity for production will be greatly reduced.

THE PURPOSE AND MOST IMPORTANT FEATURES OF THE INVENTION

The object of the present invention is to provide a method of grinding saw teeth whereby a large number of blank saw bands can simultaneously be provided with teeth. It is a further object of the invention that such grinding is accomplished in one work phase whereby the teeth simultaneously receive their respective positive or negative hook and their final shape. These objects have been achieved through a method wherein the grinding wheel, at the start of every reciprocating grinding movement, is adjusted (lowered) a predetermined distance corresponding to the wear of the grinding wheel after one grinding cycle is accomplished. The grinding wheel, as it moves towards the band material, passes a stationary abrasing wheel which reshapes the grinding wheel. The step-by-step movement of the saw bands for feeding the blank band members is controlled by the return stroke of the grinding wheel to its initial position. The grinding wheel passes over the saw bands twice and then returns to its initial position and is set for grinding a new set of teeth after it is reshaped by the abrasing wheel.

The device for performing the above described method can be characterized as follows: the grinding wheel is arranged at the beginning of each grinding cycle to be displaced towards a stationary abrasing wheel. The abrasing wheel is arranged in the path of the grinding wheel in front of the holding mechanism for the saw band material. The abrasing wheel has a shape complimentary to that of the saw tooth shape. Prior to each new grinding cycle, the grinding wheel is adjusted to compensate for the wear it experienced during the prior grinding cycle. Additionally, the feeding and holding mechanism for the saw band blanks is arranged to index upon the return stroke of the grinding wheel at the termination of a grinding cycle.

DESCRIPTION OF THE EMBODIMENTS

Figure 1:
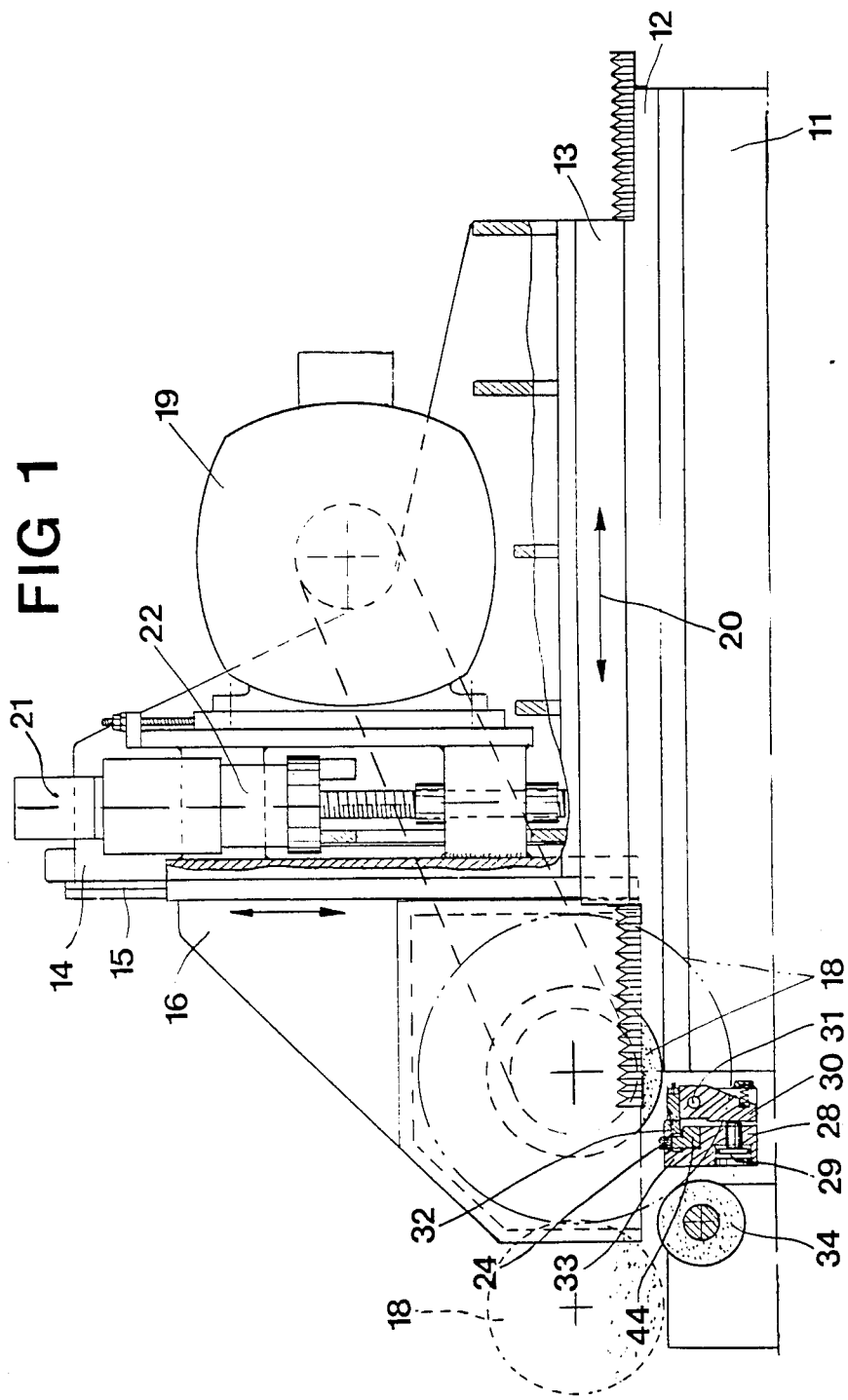
FIG. 1 is a side view of a grinding device according to the present invention.
Figure 2:
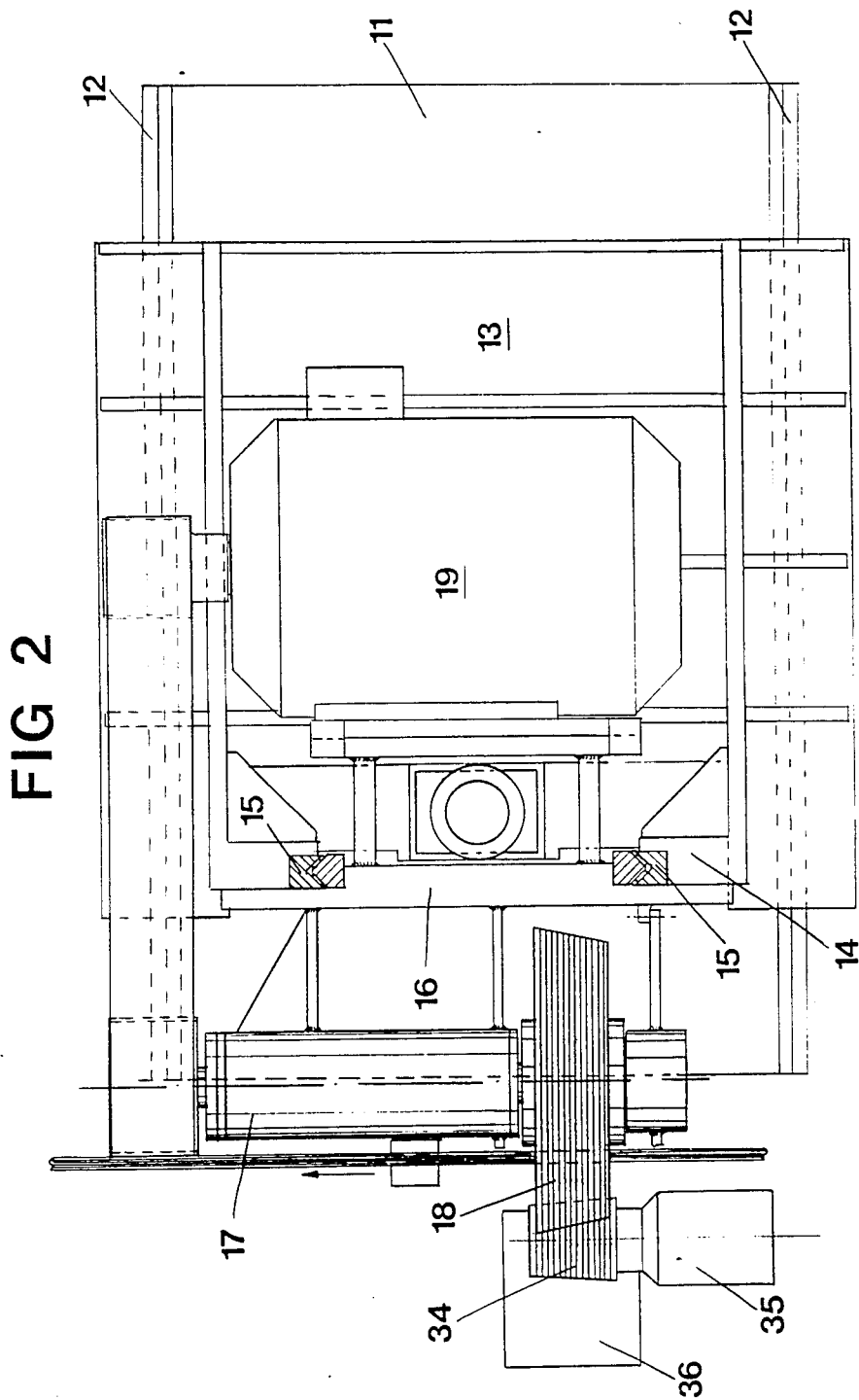
FIG. 2 is a plan view of the grinding device shown in FIG. 1 with the safety device for the grinding wheel removed.
Figure 3:
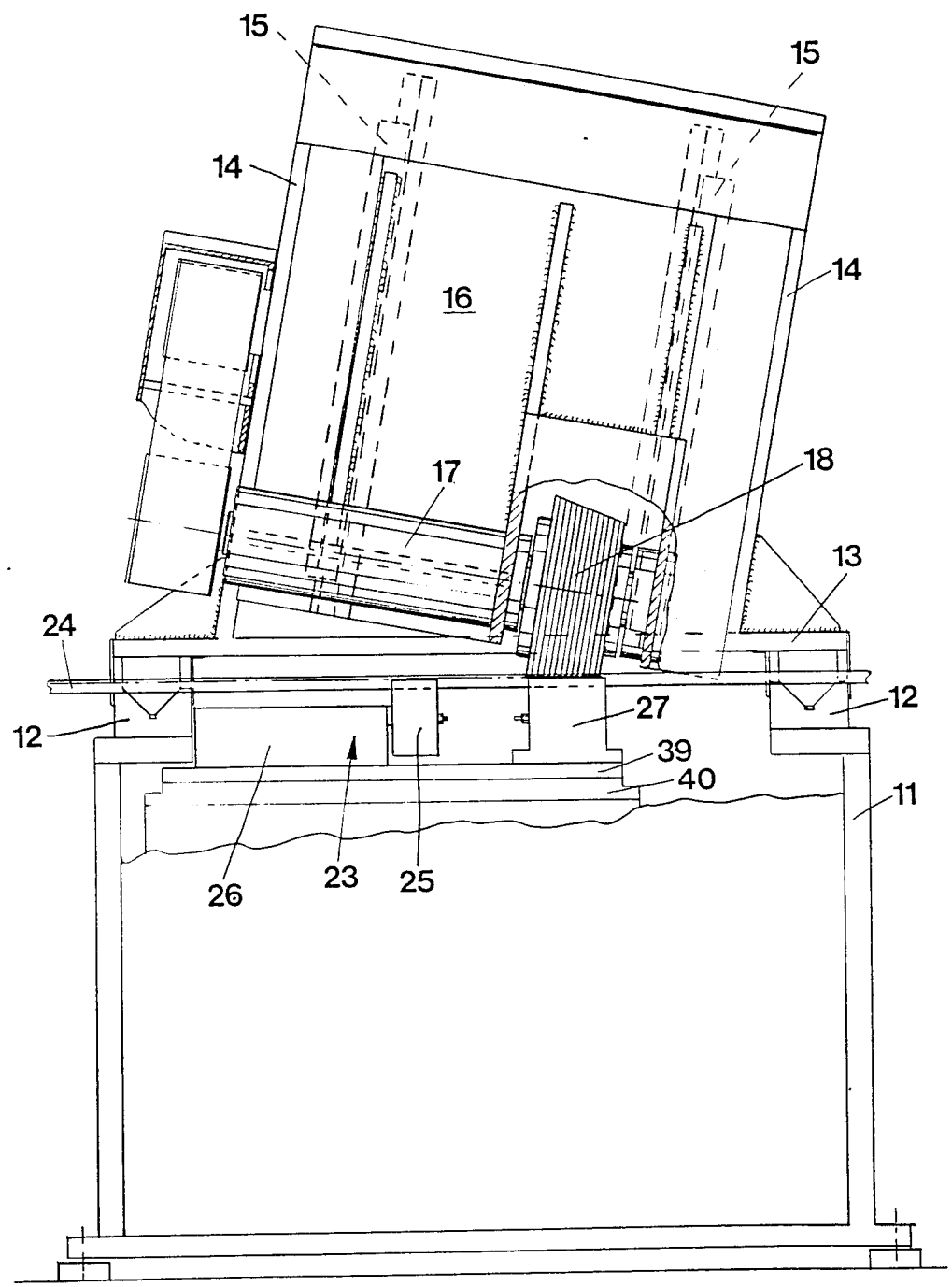
FIG. 3 is an end view of the grinding device.
Figure 4:
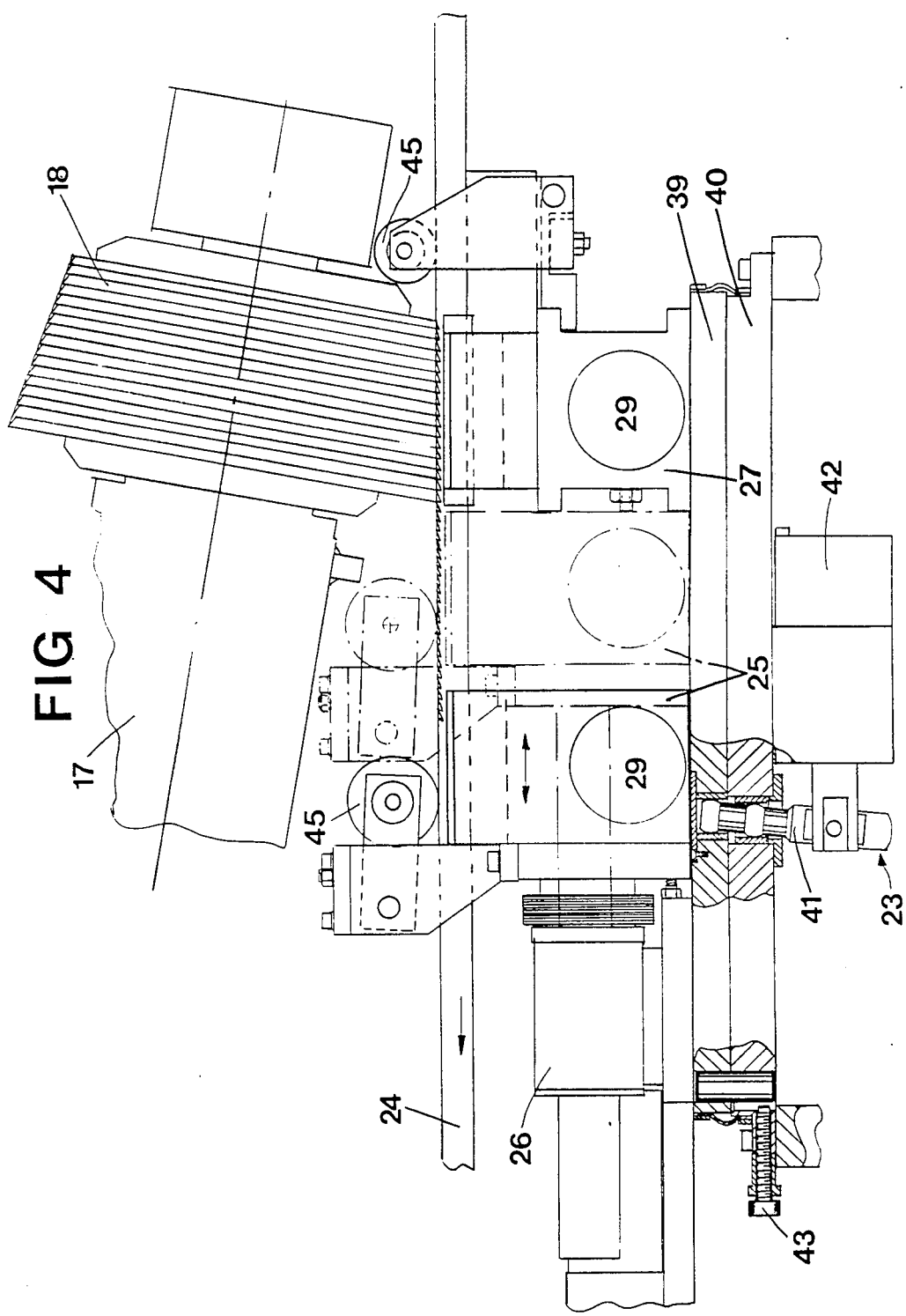
FIG. 4 is an enlarged view of the details of the grinding wheel and the mechanism for holding and indexing the blank saw bands.

With reference to FIGS. 1–4, the present invention will be described. The invention is made up of a box shaped stand 11 equipped with guiding rails 12 for a slide 13, which supports an L-shaped stand 14 with guides 15 for displaceable carriage 16. The inclination angle of the displaceable carriage 16 is adjustable, so that production of teeth with positive or negative hook is possible. The carriage 16 supports a bearing device 17 for grinding wheel 18, which is driven by electric motor 19.

Slide 13 is displaced in the direction of arrow 20 by means of motor driven actuator 22. In FIG. 1, the grinding wheel 18 is shown with continuous lines in its most worn position, and is shown in dash and dot lines in its new condition. The grinding wheel 18 is also shown with dotted lines in one of its end positions, which is also the initial position.

Stand 11 contains mechanism 23 which holds and indexes a stack of steel bands 24. Such a stack of steel bands may contain up to 80 blanks which are successively unwound from a roll. Each roll is placed on one side of the grinding device in an unreeling device. Similarly, on the other side of the grinding device, the bands are placed in a reeling device.

Mechanism 23 contains a moveable holder 25. The moveable holder is displaceable in the longitudinal direction of saw bands 24 by linear actuator 26. Mechanism 23 also includes a stationary clamping attachment 27. The moveable and stationary clamping devices, 25 and 27 consist of a fixed clamping device 28, which includes hydraulic piston 29, which acts on spring loaded lever 30 which pivots around shaft 31. Spring loaded lever 30 includes adjustable gripping jaw 32 which presses the stack of saw bands 24 into engagement against fixed gripping jaw 33. Clamping attachments 25 and 27 are individually actuable according to fixed schedules. Their respective actuation schedules interact such that while stationary clamping attachment 27 is arresting movement of saw bands 24 during grinding, the moveable clamping attachment 25 moves in a direction towards a collecting position. When the moveable clamping attachment 25 has reached the collection position, the stationary clamping attachment 27 is released so that the moveable clamping attachment 25 can move the stack of saw bands an exact distance equivalent to the number of saw teeth ground.

The grinding wheel 18 moves in a linear reciprocating manner relative to the saw blanks. During its movement, grinding wheel 18 passes abrasing wheel 34. Abrasing wheel 34 is driven by motor 35 which is carried in bracket 36 attached to stand 11. The abrasing wheel 34, which has the same shape as the prospective saw, is preferably a profiled roll provided with diamonds on its cutting surface.

As the diameter of the grinding wheel 18 is reduced after each grinding stroke, means are arranged for controlling the lowering of the grinding wheel 18 to the predetermined level at which abrasing is performed. These means include a breaker, which controls the lowering of the stepping motor, so that the grinding wheel 18 is lowered an empirically determined distance which corresponds to the presumed wear. The means might also include a touchless electronic sensing and governing means which would govern the stepping motor 21 of the carriage 16.

Figure 5:
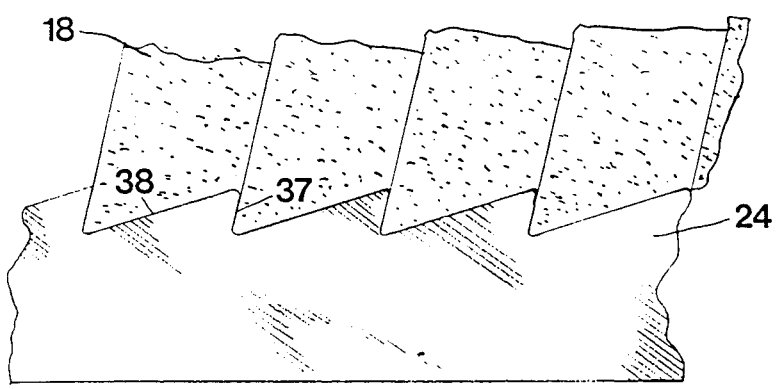
FIG. 5 shows the grinding cycle during the movement of the carriage in a first direction.
Figure 6:
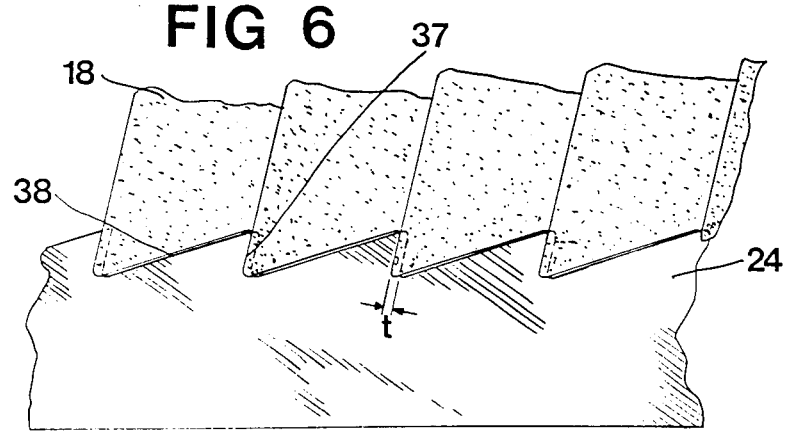
FIG. 6 shows the grinding cycle with the carriage moving in an opposite direction to the first direction (the reshaping movement)

During the initial stroke of the grinding wheel 18 it is not possible to achieve a sharp pointed saw tooth. This is not achieved until the return movement of the grinding wheel. With reference to FIG. 5, the grinding wheel is shown moving in its initial direction. The stack of saw bands 24 is then moved a few tenths of a millimeter simultaneously with the adjustment of the grinding wheel 18. This small movement allows the breasts 37 or backs 38 of the saw teeth to be ground so that they will receive sharp points. In FIG. 6 it is shown how the breasts 37 of the saw teeth are machined on the return stroke of the grinding wheel 18 to receive their sharp points.

In order to obtain this small displacement of the stack of saw bands 24 in relation to the grinding wheel, the fixing and feeding mechanism 23 is mounted on a plate 39, which is displaceable relative to plate 40. Lever 41 and linear motor 42 control the desired side displacement of fixing and feeding mechanism 23. The length of displacement is adjustable by adjusting screw 43. During the grinding movement plate 39 is fixed relative to plate 40.

The stack of saw bands 24 is kept in arrangement against a horizontally located ruler 44. Each clamping device 25 and 27 has a ruler 44 contained therein. Hold down member for the bands 45 presses the bands into contact with ruler 44. Hold down member 45 of the moveable clamping device 25 is connected to the clamping device and therefore moves in conjunction with the clamping device. The hold down member 45 consists of plastic material, e.g. polyurethane.

Figure 7:
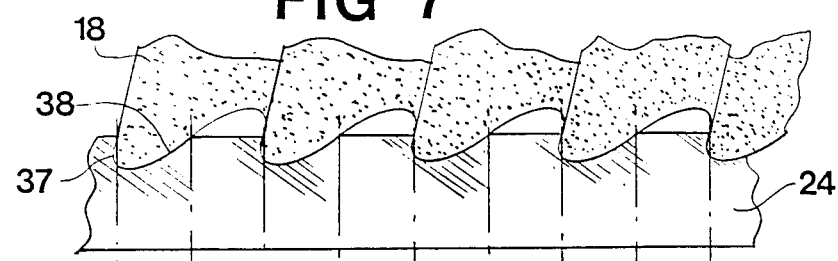
FIG. 7 shows a view analogous to FIG. 5, for the grinding and shaping of every second tooth for saw teeth with a small pitch.
Figure 8:
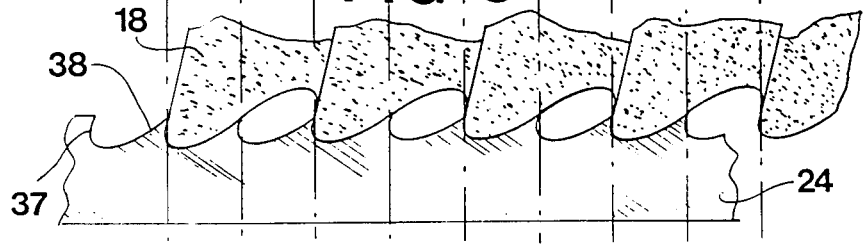
FIG. 8 shows a view analogous to FIG. 6 for the grinding and shaping of saw teeth with a small pitch as in FIG. 7.

The grinding device operates in the following manner: the grinding wheel 18, at the start of each cycle, is located to the left of the abrasing wheel 34 in FIG. 1. The grinding wheel is then automatically lowered a predetermined distance, which depends on the wear of the grinding wheel, by means of stepping motor 21. The grinding wheel 18 then starts its linear movement (in an accelerated condition) to a position just before it contacts abrasing wheel 34. The linear velocity of the grinding wheel 18 is reduced to a suitable value for its reshaping as it passes the stationary abrasing wheel. The grinding wheel 18 is then reaccelerated to a position just before it contacts the steel bands 24. Its velocity is then reduced to a suitable grinding feed and proceeds across the entire stack of bands 24 in accordance with FIG. 5 or 7. When the grinding wheel 18 has entirely passed the stack of bands 24, the hydraulically fixed plate 39 is released from the base plate 40 and the displacement of the plate 39 is effected equivalent to the sharpening measure "t" as shown in FIG. 6, or according to tooth pitch as shown in FIG. 8. The plate 39 is again fixed and the return stroke of the grinding wheel now begins. The grinding wheel moves at a velocity suitable for sharpening the teeth by completing the grinding of the breasts and backs of the saw teeth according to FIG. 6. The grinding wheel 18 can also be positioned to grind the space between previously ground teeth as an alternative method of obtaining sharp teeth.

When the grinding wheel 18 has finished the grinding part of its stroke, its linear velocity is increased and it returns to the initial position of the cycle, whereupon a new cycle is automatically initiated. During the time lapse from when the grinding wheel has left the stack of bands 24 until it returns to the abrasing wheel 34 as part of a new cycle, a forward movement of the stack of saw bands is effected. This forward movement is performed when the clamping device 27 opens its jaws and linear actuator 26 displaces the stack of saw bands by aid of clamping device 25. Clamping device 25 clamps the stack of saw bands 24 and moves from its right position at the clamping device 27 to its left position according to FIG. 4. This movement of clamping device 25 is equal to the length of the number of saw teeth ground in one grinding cycle of the grinding wheel. The clamping jaws of the fixed clamping device 27 are then closed and the clamping jaws of the moveable clamping device 25 until it is up against the fixed clamping device 27, in which position the clamping jaws of the moveable clamping device 25 are again closed.

What I claim is:

1. Method of continuously grinding the teeth of a number of adjacent saw bands out of the total band material, by a rotating, grinding wheel, reciprocatingly movable transversly to the longitudinal direction of the saw bands, said method comprising: adjusting the position of the grinding wheel, at the beginning of every reciprocating grinding movement, a predetermined amount corresponding to the wear of the grinding wheel after one grinding cycle; passing the grinding wheel on its way towards the band material by a stationary abrasing wheel for the re-shaping of the grinding wheel; effecting step-by-step movement of the saw bands by the return stroke of the grinding wheel to its initial position, after the second passage of the grinding wheel past the saw bands, whereby the grinding wheel once more passes the abrasing wheel.

2. A method according to claim 1, including displacing the saw bands during the return movement of the grinding wheel, so that the grinding wheel during the return stroke grinds the breasts or backs of the saw teeth.

3. A device for continuously grinding of a number of adjacent saw bands or saw blades out of the total band material by a rotating grinding wheel, reciprocatingly moveable transversly to the longitudinal direction of the saw bands and containing a mechanism for fixing and step-by-step feeding of the saw bands and means for abrasing the grinding wheel, in accordance with the method according to claim 1, wherein, the grinding wheel is arranged at the start of every grinding cycle to be displaced towards a stationary abrasing wheel, an amount corresponding to the wear of the grinding wheel after every reciprocating grinding movement, and a stationary abrasing wheel being arranged in the movement path of the grinding wheel in front of the fixing mechanism for the band material, which abrasing wheel has a shape complementary to that of the saw shape, and that the fixing and feeding mechanism is arranged during the return stroke after terminated grinding to effect the step-by-step movement of the band material.

4. A device according to claim 3, wherein, the grinding wheel is arranged on a carriage in an adjustable inclination position relative to the saw bands, for making possible a positive or negative hook.

* * * * *